J. M. KERR.
SHOCK ABSORBER.
APPLICATION FILED JULY 14, 1921.
1,417,179.
Patented May 23, 1922.
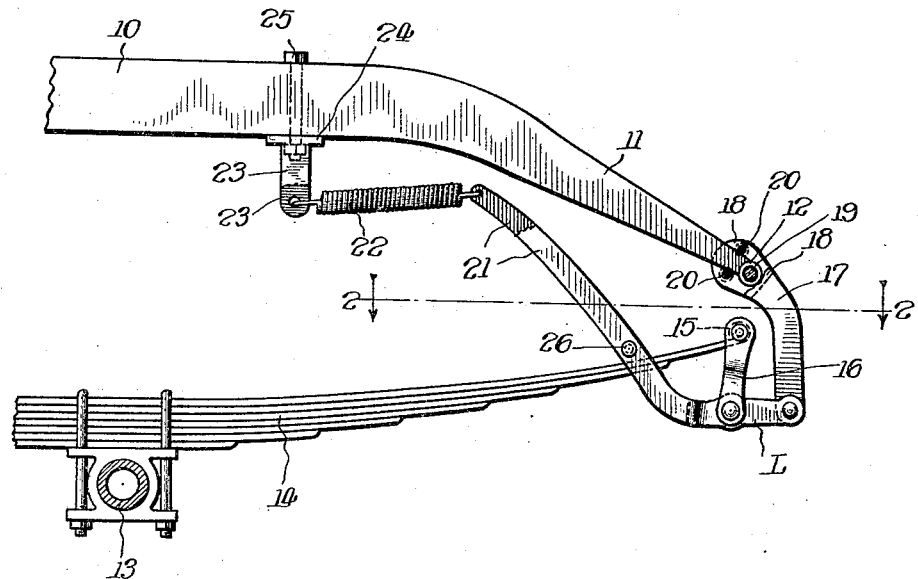
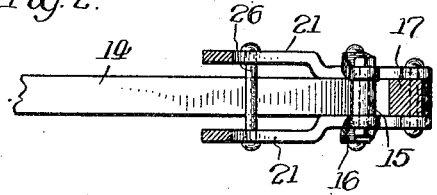
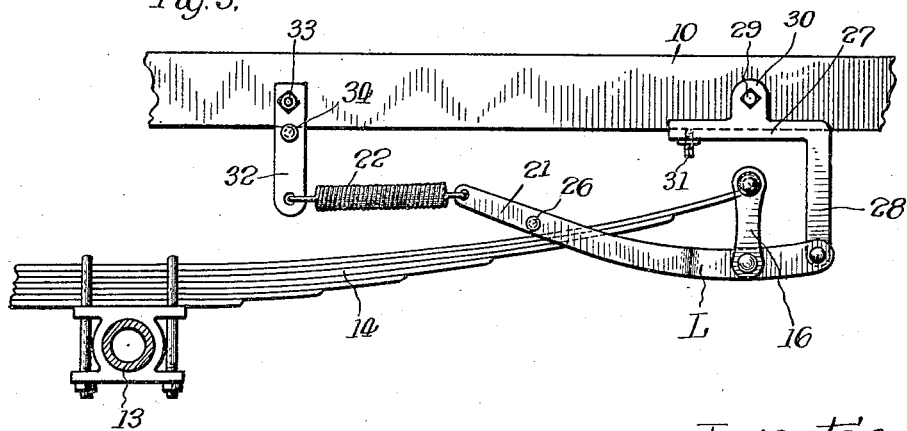
Inventor:
James M. Kerr,
By Charles J. Schmidt
Atty.
Witness:
A. J. Sauser.

UNITED STATES PATENT OFFICE.

JAMES M. KERR, OF CRAWFORDSVILLE, INDIANA.

SHOCK ABSORBER.

1,417,179.  Specification of Letters Patent.  Patented May 23, 1922.

Application filed July 14, 1921. Serial No. 484,645.

*To all whom it may concern:*

Be it known that I, JAMES M. KERR, a citizen of the United States, and a resident of Crawfordsville, in the county of Montgomery, State of Indiana, have invented certain new and useful Improvements in Shock Absorbers, of which the following is a specification.

My invention relates to shock absorber mechanism particularly adaptable for application on automotive vehicles to absorb the lesser shocks and to assist the vehicle springs in taking care of and softening the heavier shocks, and which will co-operate with the vehicle springs to retard and brake recoil action of the vehicle springs and to brake and check rebound of the vehicle frame.

On the accompanying drawing I illustrate the construction, application and operation of my improved mechanism and on this drawing;

Fig. 1 is a side elevational view of one corner of a vehicle showing a vehicle spring and the application of the shock absorbing mechanism thereto and to the vehicle body, parts being broken away, Fig. 2 is a view on plane 2—2, Fig. 1 and Fig. 3 is a side elevational view showing a modified arrangement.

On the drawing 10 represents one of the side beams of the vehicle framework and in Fig. 1 the end 11 of the beam deflects diagonally downwardly and terminates in the eye 12. On the axle 13 is secured the semi-elliptic spring 14 which terminates in the eye 15 a short distance below the eye 12. In the original arrangement of the vehicle the eyes receive a shackle member 16 which member however is released from the eye 12 for the purpose of applying my shock absorbing attachment. The shackle member is swung downwardly and pivoted to the lever L which at its outer end is fulcrumed on the lower end of the fitting 17 secured on the end of the frame part 11. The fitting has the ears 18 between which the end of the frame member 11 extends, the bolt 19 passing through the eye 12 and pins 20 being provided through the ears, one at each side of the frame part 11 to assist the bolt in rigidly holding the fitting in place. The shackle member 16 is pivoted to the lever close to its fulcrum end and extending diagonally upwardly from the inner end of the lever body are the arms 21, each of which is connected at its upper end by a contractive spring 22 with one of the arms 23 of the bracket member 24 secured on the vehicle frame part 10 by suitable bolt mechanism 25. The arms 21 are separated a sufficient distance to permit play of the spring 14 between them and also to permit the arms to swing alongside of the spring. Extending through and between the arms a short distance above the spring 14 is the abutment pin 26.

Describing the operation, the spring 14 travels bodily up and down with the axle as the wheels strike bumps or ruts in the roadway. The spring movements caused by the lesser bumps or depressions are practically entirely absorbed by the shock absorber attachment and never reach the vehicle frame. During relative movement of the spring 14 and the body the lever will be rocked on its fulcrum against the resistance of the shock absorbing springs 22, the arm ends of the lever having a decided leverage advantage over the fulcrum end so that the springs 22 may be made comparatively light and very responsive and sensitive. The arms of the lever are also sufficiently spaced apart to pass along the sides of the frame part 11 as the springs 22 expand.

As the springs expand, their resistance increases and during travel of the vehicle over more violent bumps and depressions the elastic limit of the springs may be reached but before this time the vehicle springs themselves will have come into play to assist the shock absorbing springs in taking up such shocks. In other words, the shock absorber springs cooperate with the vehicle springs to gradually transmit road shocks toward the vehicle frame, but the lesser shocks are absorbed practically entirely by the absorber springs, and the heavier shocks, if not entirely absorbed eventually by the vehicle springs will nevertheless have been so toned down and softened that the transmission of any shock that is left to the vehicle will be gradual and not disagreeable.

When the vehicle encounters a very heavy bump the body of the vehicle will tend to throw upwardly an abnormal distance from the springs, or if the vehicle wheels encounter a deep rut or depression, the spring will first be heavily compressed and then when the wheels climb out of the depression suddenly the tendency will be to throw the vehicle body upwardly an abnormal distance.

Such abnormal separation or rebound or recoil of the frame is, however, braked and snubbed in my arrangement, for when the vehicle body moves away from the vehicle spring it will rotate the lever L in the opposite direction a sufficient distance only to bring the abutment pin 26 against the vehicle spring whereafter further swing of the lever will be prevented and the vehicle spring will then resist and check further separation of the body from the vehicle spring. By my improved attachment therefore the various road-irregularities encountered by a vehicle are amply taken care of and such shocks as are not completely absorbed before reaching the vehicle body are toned down and their force gradually transmitted to the body so that the riding qualities of the car will not be made disagreeable.

In Fig. 3 I have shown a modified arrangement. Here, the vehicle frame side beam 10 is straight and above the end of the vehicle spring 14 is provided with the bracket 27 between whose arms 28 the outer end of the lever L is fulcrumed. The shackle member 16 which originally suspended the spring end from the beam 10 is released from the beam and swung downwardly and pivoted to the lever L near its fulcrum end. The bolt hole primarily utilized for attaching the shackle to the beam is now utilized for securing the bracket 27, the bolt 29 passing through the ears 30 on the bracket and through the beam 10, a set screw 31 being provided for engaging with the under side of the beam to assist the bolt in rigidly holding the bracket in place.

The arms 21 of the lever L extend diagonally inwardly and upwardly past the vehicle spring 14, and each arm is connected by a spring 22 with a plate or bar 32 secured to and extending from the vehicle frame. The two bars may be connected in common by a bolt 33 to the side beam and to prevent rotation of the bars pins 34 may be provided to engage with the under side of the beam. The hole for receiving the bolt 33 may be a hole which is already in the side beam when the vehicle is constructed. Extending between the lever arms 21 over the spring 14 is the abutment pin 26 which serves the same purpose as the pin 26 in the arrangement of Fig. 1. The operation of the arrangement of Fig. 3 is precisely the same as that of the arrangement of Fig. 1, the lever L being free to rock during normal relative movement between the spring and the frame, and reverse rotation of the lever being blocked by the abutment pin 26 during abnormal separation of the vehicle spring and frame.

Having described my invention I claim as follows:

In a vehicle, the combination with the vehicle axle, a leaf spring secured on said axle at right angles thereto, a shackle member suspended from the outer end of said spring, the vehicle framework, said framework having a bolt hole originally used for securing said shackle member, a fitting secured to the framework by a bolt passing through said bolt hole, said fitting extending downwardly below and outside of the vehicle spring end, a lever fulcrumed at its outer end at the lower end of said fitting, said shackle member being pivoted to said lever, the inner end of said lever extending diagonally inwardly and upwardly past the vehicle spring, shock absorber springs connected at one end with the inner end of the lever and connected at the other end with the vehicle framework, and an abutment pin on said lever inside of the pivot connection of said shackle with the lever and above said vehicle spring for preventing reverse rotation of said lever during abnormal separation of said spring and framework.

In witness whereof, I hereunto subscribe my name this 9th day of July, A. D., 1921.

JAMES M. KERR.